March 21, 1967 K. DRELICHOWSKI 3,310,342
ANTI-WHIPLASH DEVICE
Filed Jan. 27, 1965 3 Sheets-Sheet 2
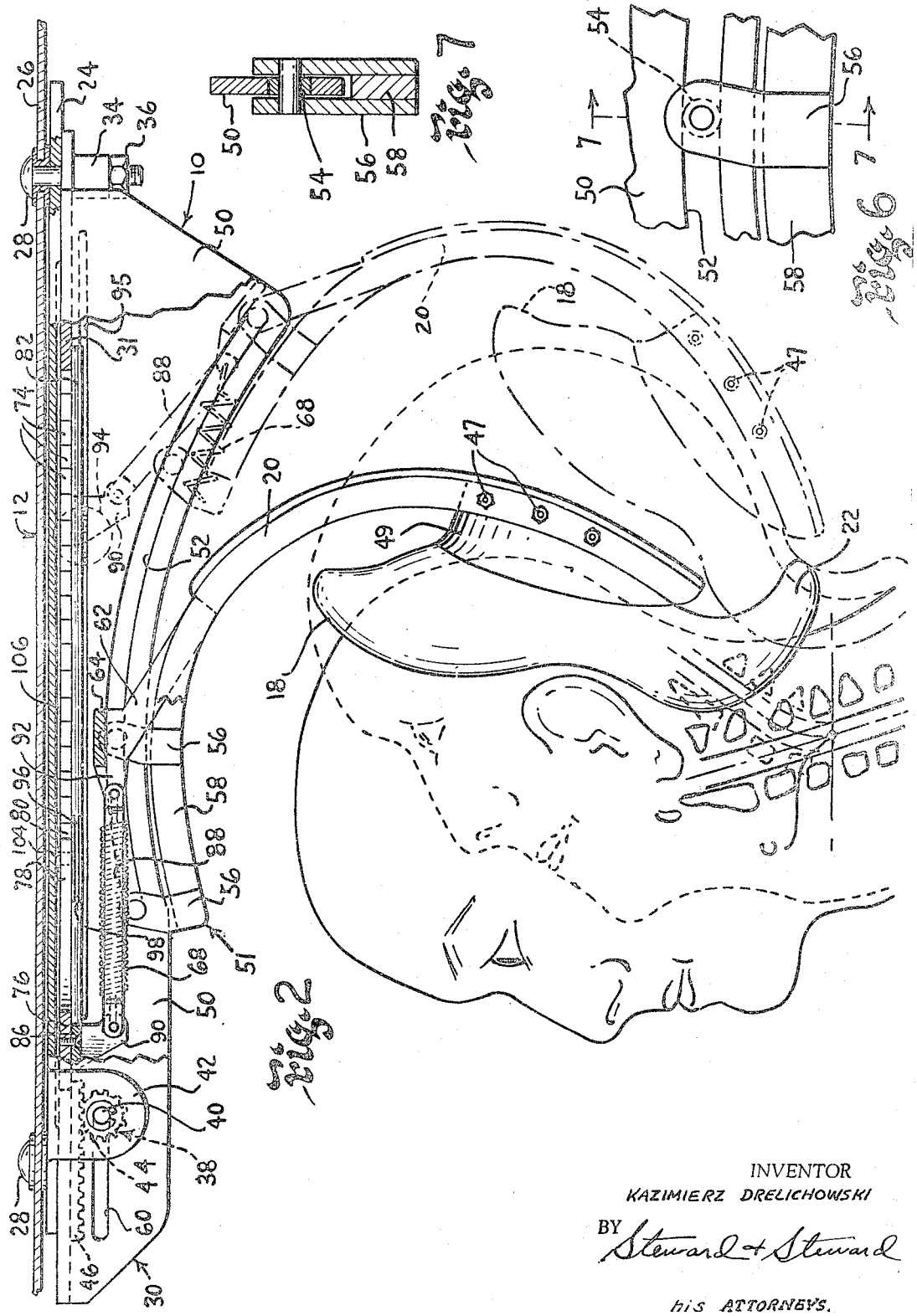
INVENTOR
KAZIMIERZ DRELICHOWSKI
BY Steward & Steward
his ATTORNEYS.

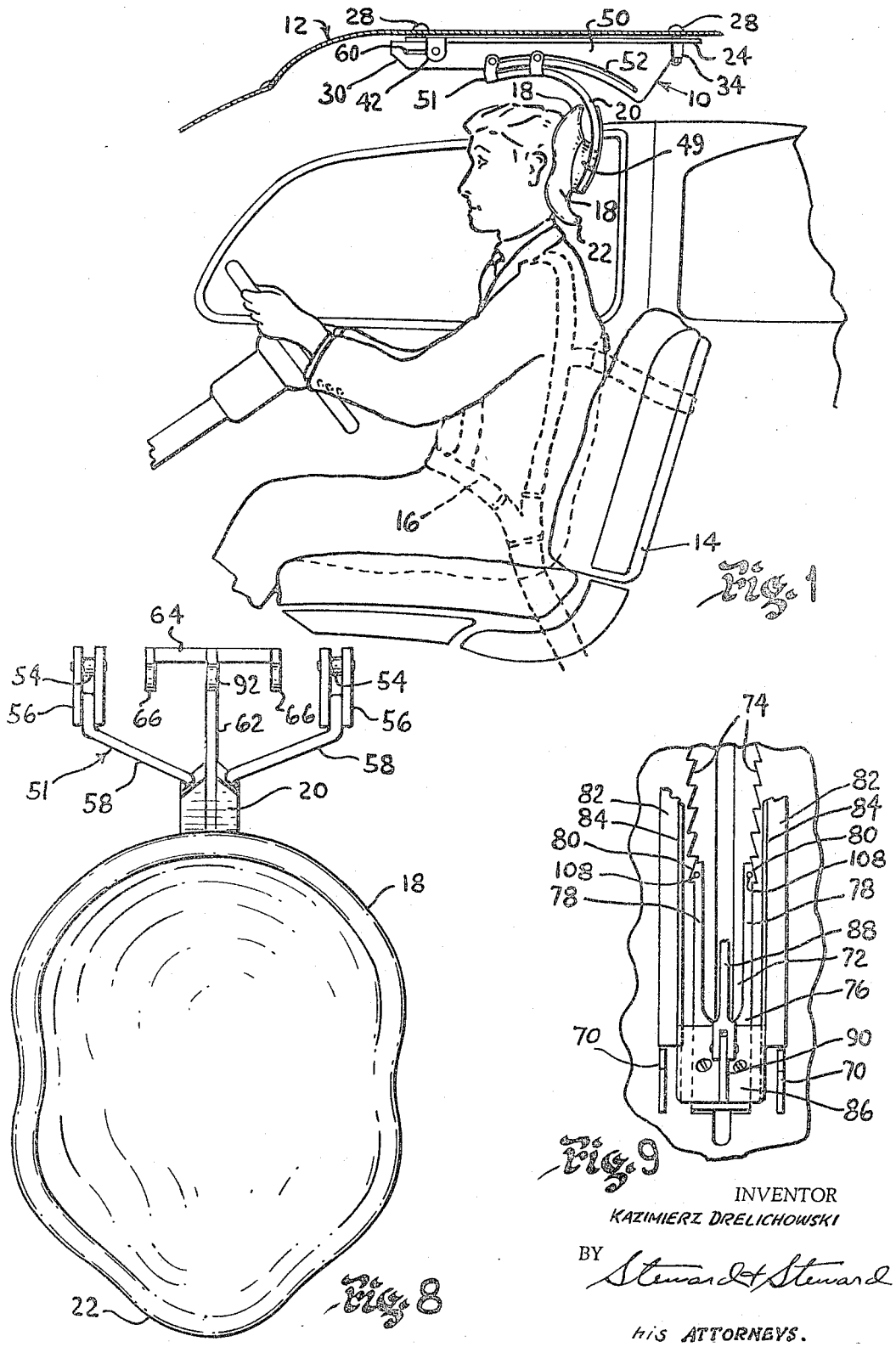

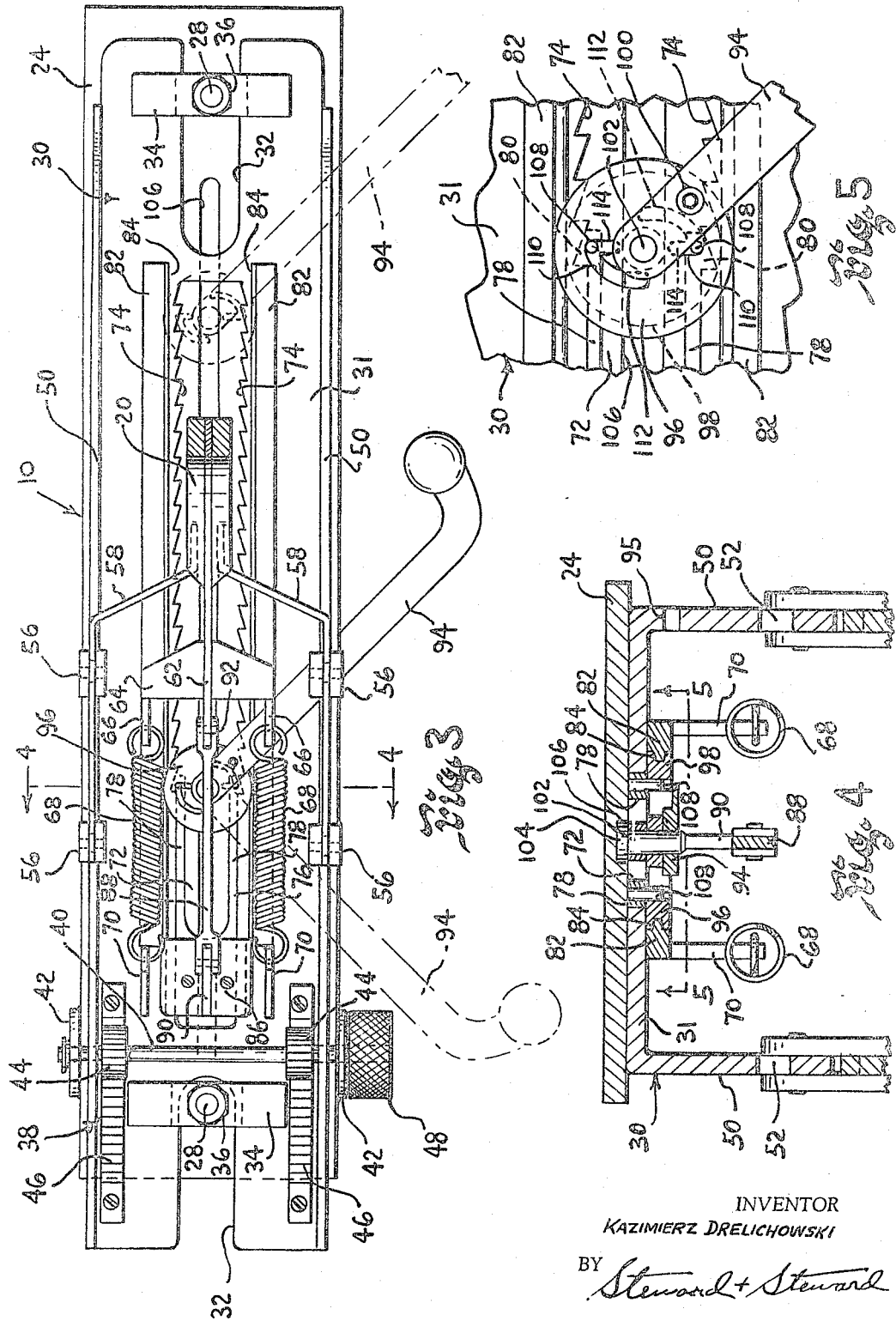

United States Patent Office 3,310,342
Patented Mar. 21, 1967

3,310,342
ANTI-WHIPLASH DEVICE
Kazimierz Drelichowski, 66 Prospect St.,
Union City, Conn. 06770
Filed Jan. 27, 1965, Ser. No. 428,367
8 Claims. (Cl. 297—395)

This invention relates to safety devices for the prevention of injuries to occupants of a vehicle in the event of an accident, and it relates more particularly to devices for preventing injuries of the kind caused by what is known as "whiplash" or the sudden snapping back of the head of an occupant of a vehicle in a rear-end crash or similar accident. The safety device of the present invention is applicable for use in trucks, buses, racing cars, sports cars and the like, as well as for passenger cars, and it may be installed for any of the occupants of the vehicle.

When a rear-end collision takes place, the head of a person riding face-forward in the vehicle, which has been struck in the rear, snaps backward suddenly, placing a severe strain on the neck at the base of the skull and frequently resulting in a fracture of one or more cervical vertebrae or in some other serious injury to the spinal column. Headrests of various kinds have been provided here-to-fore for preventing the head from snapping back in this situation. However, such devices, even though they may be intended to prevent injury due to whiplash, can frequently do as much harm as good, and in any event, they have been rather inadequate for one reason or another. One of the reasons for serious injury due to whiplash, where such prior arresting devices have been employed, is that the initial impact is followed immediately by a rebound action on the part of the impact-absorbing device. Such rebound snaps the head forward again with nearly as much violence as the initial rearward movement, but with even more damaging effect on the victim due to the sudden reversal of the direction of the forces involved.

It is accordingly an object of the present invention to provide a more satisfactory means than has been devised here-to-fore for protecting a person in a vehicle against injury due to whiplash. This object is achieved in accordance with the invention by absorbing the shock of the impact by means of a resiliently mounted headrest, while at the same time preventing the headrest from snapping or bouncing back after the initial impact has been absorbed. In one form of the invention, a support for the headrest is rigidly fixed on the vehicle with the headrest mounted on a carriage in back of the head of a person at any particular location in the vehicle, as for example the driver's seat. The carriage prevents reciprocal movement of the headrest in a direction substantially parallel to the direction of the force of impact, so that it can move relative to the vehicle upon collision of the vehicle with another object. A coil spring, air cylinder, or similar resilient means is provided, against which the headrest and its carriage are depressed by the force of the impact, and in addition, means are provided for releasably restraining the headrest in its depressed position, so that it will not rebound upon reaching its limit of travel. Such releasable restraining means may be a mechanical latch for example, or a hydraulic check.

Another thing which has contributed substantially to spinal injuries in cases where so-called whiplash arrestors of prior design have been employed is the fact that the shock-absorbing device moves horizontally in a straight line, whereas the natural movement of a person's head fore-and-aft is along the arc of a circle whose center is located at the base of the skull. Consequently, if the headrest of the shock-absorbing device travels straight back upon rear-impact, the head is carried by the headrest in an unnatural direction, and this in itself can cause serious injury to the neck.

It is therefore another object of the invention to provide an anti-whiplash device which supports the head while permitting it to swing back along an arcuate path so that no additional strain is introduced by the headrest which may contribute to an injury.

These and other objects and advantages of the present invention will become more apparent from the following detailed description of a specific embodiment of the invention, which is shown in the accompanying drawings, wherein FIG. 1 is a fragmentary side elevational view showing the driver's seat of an automobile with an anti-whiplash device of the invention installed for the protection of the driver;

FIG. 2 is an enlarged view similar to FIG. 1 but showing only the anti-whiplash device, parts thereof being broken away and in section in order to show the device in greater detail;

FIG. 3 is a bottom view of the device as shown in FIG. 2, but with the headrest removed;

FIG. 4 is a cross-section taken on the line 4—4 of FIG. 3, but on a still larger scale;

FIG. 5 is a detail bottom view taken on the line 5—5 of FIG. 4 showing the release mechanism;

FIG. 6 is a detail view in side elevation of a part of the headrest carriage;

FIG. 7 is a cross-section taken on the line 7—7 of FIG. 6;

FIG. 8 is a front elevation of the headrest and carriage therefor; and

FIG. 9 is a detail bottom view of the latching-slide assembly.

As best illustrated in FIGS. 1 and 2, the anti-whiplash device 10 is mounted by way of example in the ceiling or roof 12 of the vehicle above the head of the occupant, in this instance the driver of the car, who is sitting in the seat 14 and faces forwardly. It will be understood, however, that in some cases the installation may be for a passenger facing backward, as in the case of nine-passenger station wagons with a rear-facing, far-back seat. In that event the anti-whiplash device would be used to protect passengers in the far-back seat in case of a head-on collision. However, for purposes of the present disclosure, it will be assumed that the installation is at the driver's seat. The occupant will of course be provided with a seat belt or crash harness 16, which will locate his body in a fixed position on seat 14, so that his head will be directly in front of a headrest 18 mounted on a rearwardly and downwardly curved yoke assembly 20 of the anti-whiplash device 10. The headrest 18 is preferably a bowl-shaped member, to receive the back of the head as it is suddenly snapped back by an impact from the rear. The inner bowl portion of the headrest is desirably lined with sponge-rubber padding, and its lower edge has a rearwardly curved portion 22 contoured to fit the back of the neck in order to provide support therefor when the head is tilted backward, as shown in broken lines in FIG. 2.

Reference is now had more particularly to FIGS. 2, 3 and 4 and to the manner in which the anti-whiplash device 10 is mounted in the vehicle for adjustment to fit people of different height, some of whom sit farther forward in order to reach the foot-pedals if their legs are short, while others adjust the seat 14 rearwardly for more leg-room. A ceiling mounting plate 24 is rigidly fastened to the underside of a ceiling frame member or panel 26 by means of a pair of mounting bolts 28, 28, one located near the front end of mounting plate 24, the other near the rear end. Below mounting plate 24 is adjustably secured a channel-shaped bracket 30 which may be shifted forward or back relative to mounting plate 24 in order to bring headrest 18 into proper fore-and-aft position with respect to the occupant's head.

As may be seen in FIG. 3, the opposite ends of bracket 30 are provided in its flat base plate 31 with open-ended slots 32, 32, through each of which a mounting bolt 28 extends downward into and through a mounting block 34 spanning slot 32. A nut 36 on the end of each mounting bolt 28 may be turned up tight against its mounting block 34, in order to immovably secure bracket 30 to mounting plate 24, which in turn at the same time becomes rigid with the ceiling panel 26 of the vehicle. By loosening nuts 36, 36, bracket 30 may slide longitudinally relative to mounting plate 24 in order to adjust the headrest 18 in a fore-and-aft direction.

In order to facilitate such fore-and-aft adjustment, a rack-and-pinion adjusting device 38 (FIG. 3) is provided at the front end of the assembly. Adjusting device 38 includes a shaft 40 which is journalled near its opposite ends in side tabs 42, depending from and integral with ceiling mounting plate 24. A pair of pinion gears 44, 44 are fixed to shaft 40 inwardly of its ends and mesh with a pair of gear racks 46, 46 fixed to the underside of the base plate 31 of bracket 30. A hand-knob 48 is rigidly fastened to the end of shaft 40, which extends beyond one of the side tabs 42. In order to rotate shaft 40 so as to adjust bracket 30 forward or back when mounting nuts 36 are loose, hand-knob 48 is simply turned one way or the other.

Once the fore-and-aft adjustment is made, the headrest 18 is then adjusted vertically on its yoke 20 by loosening its mounting screws 47 and sliding its mounting bracket 49 up or down on yoke 20 so that the bowl of the headrest lies directly behind the occupant's head. Screws 47 and nuts 36 are then tightened securely in order to hold the device in correct adjustment.

Along the sides of and integrally forming a part of bracket 30 are laterally spaced, parallel, side walls 50 (best seen in FIGS. 2 and 4), which extend vertically downward from the base plate 31 thereof. Side walls 50 provide strength and rigidity to the bracket 30 and, in addition, serve to mount headrest 18 and its carriage 51, including yoke 20, for movement longitudinally thereof. To this end, side walls 50 are provided with arcuate slots 52, along each of which travels a pair of rollers 54 (FIG. 6) journalled in upstanding bearing blocks 56, which straddle side walls 50 and are mounted at their lower ends on side arms 58 of carriage 51. As best viewed in FIGS. 3 and 8, side arms 58 bend inwardly and join with yoke 20. It will be noted that the lower edges of side walls 50 of bracket 30 adjacent slots 52 are arcuately shaped like slots 52 and concentric therewith, thereby facilitating mounting of carriage 51 for movement along slots 52. Forward of slots 52 side walls 50 are disposed just inwardly of side tabs 42 which depend from mounting plate 24. Longitudinal slots 60 are formed in the forward part of side walls 50 so that shaft 40 of adjusting device 38 may extend outward thereof for engagement with side tabs 42 of mounting plate 24.

Carriage 51, on which headrest 18 is mounted, also includes a central leg 62 located between side arms 58 and extending upward and forward of the juncture of side arms 58 with yoke 20. Near the end of central leg 62 is mounted a spring-fastening bracket 64, at each side of which is provided a mounting lug 66, to which a shock-absorbing coil spring 68 is connected. The opposite ends of coil-springs 68, 68 are connected to braces 70, 70 rigidly fixed to the underside of base plate 31 of bracket 30. A central longitudinally extending slot 72 is formed in the web-portion or base plate 31 of bracket 30, the longitudinal edges of slot 72 being serrated to provide oppositely disposed ratchet teeth 74. A bifurcated slide member 76 (FIG. 9), which has the general appearance of a tuning fork with resilient prongs 78, slides longitudinally within slot 72. Prongs or pawls 78 are provided on their outer edges near their ends with outwardly projecting teeth or barbs 80, which engage with ratchet teeth 74 on the inner edges of slot 72. Teeth 74 and barbs 80 are so shaped that prongs 78 are sprung inwardly by teeth 74 when slide 76 is moved rearward of the assembly, or to the right as viewed in FIG. 3. However, unless prongs 78 are manually sprung, movement of slide 76 in the opposite direction is positively prevented by engagement of barbs 80 with teeth 74.

Secured to the under surface of base plate 31 along each side of central slot 72 is a rail 82, the inner edge of which has a longitudinal tongue 84 extending the full length thereof in order to slidably receive a guide-plate 86 which is securely fastened to the underside of slide member 76 at its end opposite legs 78. The lateral edges of guideplate 86 are grooved to fit tongues 84 on the inner edges of rails 82. It is thus seen that guide-plate 86 forms a part of slide 76 and supports it for longitudinal movement within slot 72, such movement being permitted in one direction by ratchet teeth 74, while movement in the opposite direction is possible only upon grasping the ends of prongs 78 of slide 76 and springing them inwardly until their barbs 80 disengage teeth 74.

Slide 76 is connected to headrest carriage 51 by a link 88, pivoted at one end to a central brace 90 on the underside of guide-plate 86 and at its other end to the forward end 92 of central leg 62. Carriage 51 may thus be forced rearward or to the right, as viewed in FIGS. 2 and 3, against the tension of springs 68, and upon termination of such rearward movement at any point along slots 52 becomes latched against return forwardly. It will, therefore, be seen that when a rear-end collision occurs and the head of the occupant is forced rearwardly against headrest 18, the carriage 51 moves back against the tension of springs 68 so as to absorb the shock but does not bounce forward again. In the case of a heavy blow from the rear, the headrest 18 and carriage 51 may be forced all the way to the rear of arcuate slots 52 as illustrated in broken lines in FIG. 2, at which point further movement is stopped in order to avoid bending the neck of the occupant too far. More important, however, is the fact that the shock-absorbing assembly is prevented from rebounding or recoiling due to the fact that slide 76 engages ratchet teeth 74 to hold the headrest 18 in whatever rearward position it reaches during the impact. Furthermore, due to the arcuate shape of slots 52 along which rollers 54 move, headrest 18 travels on the arc of a circle, the center of which is desirably located at the center C (FIG. 2) of the bend in the cervical section of the occupant's spine.

It will be seen therefore that not only is the impact on the head of the occupant absorbed by the anti-whiplash device of the present invention, but also the actual whiplashing action of the neck and head is positively prevented for the first time in devices of this kind by completely arresting the recoil or bounce-back of the shock-absorbing device. Thus, while the previous headrest and shock-absorbing devices take up the initial impact as the head of the person in the vehicle is thrown back by a rear-end collision, they also as suddenly and violently throw it forward again when the shock-absorbing mechanism recoils. Such action causes a still more dangerous condition, which may be even better likened to the lash of a whip, than that which occurs when no shock-absorbing device is used. Thus, many so-called whiplash arrestors are improperly named because they contribute to, rather than diminish, the whiplashing effect of a violent impact from the rear. That, however, is not the case in the device of the present invention wherein the shock of the rapid backward movement of the head is taken up by the shock-absorbing springs 68 but without the damaging rebound of the headrest which is restrained in its rearwardly displaced position by the slide 76.

Moreover, by traveling in an arcuate path the headrest 18 of the present invention cradles the occupant's head at the same point during its entire rearward travel, thus permitting the neck to bend naturally without introducing other injurious stresses or strains thereon.

In order to reset the anti-whiplash device 10 after a rear-end collision, a lever 94 is provided, which can be swung forward from its full-line position shown in FIG. 3 to its broken-line position, in order to spring prongs 78 of slide 76 inwardly, thereby unlatching the shock-absorbing assembly so that it can be drawn forward again by springs 68. Lever 94 consists of a flat bar which extends laterally out through a longitudinal access slot 95 in one side wall 50 of bracket 30 close to the ceiling of the automobile where it is out of the way. The inner end of lever 94 is fastened to a pulley-like disk 96 the periphery of which has a circumferential groove 98 (FIG. 4). The diameter of disk 96 is such that groove 98 receives the tongues 84 on rails 82 at diametrically opposite points so that disk 96 is thereby supported on rails 82 for free sliding engagement thereon with slide member 76.

Lever 94 is rigidly secured to disk 96 by an eccentrically located mounting bolt 100 (FIG. 5). In addition, a pivot pin 102 extends freely through the center of disk 96 and the end of lever 94, so that disk 96 may be pivoted thereon by lever 94. Pivot pin 102 has an enlarged flat head 104 (FIG. 4) at its upper end, which slidably fits within an elongated guide-groove 106 in the underside of ceiling mounting plate 24. Guide-groove 106 extends centrally of and parallel to slot 72 in bracket 30 so that the head 104 of pivot pin 102 may slide therein without interfering with the longitudinal movement of disk 96 along rails 82. At the same time, however, the head of pin 102 provides support within guide-groove 106 when disk 96 is pivoted by manipulation of lever 94.

Disk 96 is operatively connected to slide 76 by a pair of connecting pins 108, 108 fixed in the ends of prongs 78, 78 adjacent barbs 80. Each connecting pin 108 extends downwardly from its prong 78 into a slot 110 in disk 96 (FIG. 5). Each slot 110 has a cam portion 112, which is eccentric to pivot pin 102, and a radial portion 114, which extends from the most distant end of cam portion 112 toward pin 102. The cam portions 112 of slots 110 both extend in the same direction circumferentially from their outermost ends radially toward their inner ends, such that upon pivoting disk 96 by means of lever 94 in a clockwise direction, as viewed in FIGS. 3 and 5, pins 108 engage within cam portions 112 of slots 110 and are drawn inwardly thereby in order to release barbs 80 on prongs 78 from ratchet teeth 74. A simple releasing device is thereby provided for resetting the carriage 51. Radial portions 114 of slots 110 in disk 96 are provided in order to allow free inward movement of pins 108 and prongs 78 when slide 76 moves rearward during impact. It will also be noted that disk 96 and lever 94 are automatically pivoted back into their normal positions, as shown in FIG. 3, by the spring action of prongs 78 of slide 76 which exert an outward pressure for engagement with ratchet teeth 74.

What is claimed is:

1. An anti-whiplash device for preventing injury to an occupant of a vehicle upon impact of an external object with said vehicle, comprising in combination with the frame of said vehicle means for positioning the occupant upright in said vehicle, a carriage mounted on the frame of said vehicle for reciprical movement relative thereto along a path substantially parallel to the direction of the impact, a headrest mounted on said carriage and normally disposed directly behind the head of the occupant in order to cradle the head as it is thrust backward during the impact, shock-absorbing means disposed between said carriage and the frame of the vehicle for resiliently resisting movement of said carriage by the backward thrust of the occupant's head, releasable restraining means for preventing said carriage from suddenly rebounding after the impact, and a mounting bracket fixed to the frame of said vehicle for mounting said carriage on said frame, said bracket having guide means along which said carriage is movable in an arc of a circle whose center is located in the vicinity of the neck of the occupant, whereby said headrest follows the natural path of the occupant's head as it is bent backward with respect to his body.

2. The combination defined in claim 1 wherein said mounting bracket is adjustably fixed to the frame of the vehicle in a fore-and-aft direction in order to position said headrest correctly with respect to the occupant's head.

3. The combination defined in claim 2 wherein said mounting bracket is fixed to a ceiling portion of the frame of the vehicle above the head of the occupant.

4. The combination defined in claim 3, which further includes adjusting means for moving said mounting bracket fore-and-aft relative to the frame of the vehicle, said adjusting means comprising a rack-and-pinion disposed between said mounting bracket and said frame.

5. The combination defined in claim 1 wherein said releasable restraining means comprises a slide member movably mounted on said mounting bracket and connected to said carriage for movement therewith, said mounting bracket being provided with ratchet teeth along the path of said slide member, and said slide member having a pawl engageable with said ratchet teeth such that movement of said slide and carriage is permitted in the direction of the backward thrust of the occupant's head but is arrested in the opposite direction.

6. The combination defined in claim 5, which further includes means connected to said releasable restraining means for manually disengaging said pawl from said ratchet teeth in order to allow said slide member, carriage and headrest to return to their normal positions.

7. The combination defined in claim 6, wherein said mounting bracket is provided with a slot within which said slide member is disposed for movement longitudinally of said slot, said ratchet teeth being formed in opposite sides of said slot, said slide member having a pair of resilient prongs extending longitudinally of said slot, a pair of said pawls being mounted on said prongs for engagement with said ratchet teeth in the opposite sides of said slot, said prongs resiliently urging said pawls outwardly into engagement with said ratchet teeth.

8. An anti-whiplash device for preventing injury to an occupant of a vehicle upon impact of an external object with said vehicle, comprising in combination with the frame of said vehicle means for positioning the occupant upright in said vehicle, a carriage mounted on the frame of said vehicle for reciprocal movement relative thereto along a path substantially parallel to the direction of the impact, a headrest mounted on said carriage and normally disposed directly behind the head of the occupant in order to cradle the head as it is thrust backward during the impact, shock-absorbing means disposed between said carriage and the frame of the vehicle for resiliently resisting movement of said carriage by the backward thrust of the occupant's head, releasable restraining means for preventing said carriage from suddenly rebounding after the impact, a mounting bracket fixed to the frame of said vehicle for mounting said carriage on said frame, said releasable restraining means comprising a slide member movably mounted on said mounting bracket and connected to said carriage for movement therewith, said mounting bracket being provided with ratchet teeth along the path of said slide member, said slide member having a pawl engageable with said ratchet teeth such that movement of said slide and carriage is permitted in the direction of the backward thrust of the occupant's head but is arrested in the opposite direction, means connected to said releasable restraining means for manually disengaging said pawl from said ratchet teeth in order to allow said slide member, carriage and headrest to return to their normal positions, said mounting bracket being provided wih a slot within which said slide member is disposed for movement longitudinally of said slot and said ratchet teeth being formed in opposite sides of said slot, said slide member having a pair of resilient prongs extending longitudinally of said slot, a pair of said pawls being mounted on said prongs for engagement with said ratchet teeth in the opposite sides of said slot, said prongs resiliently urging said pawls outwardly into engagement with said ratchet teeth, and guide rails disposed longitudinally along opposite edges of said slot, said slide member being supported by said guide rails, said means for disengaging said pawls from said ratchet teeth comprising a circular disk having a circumferential groove in its periphery for guiding engagement with said guide rails and an elongated lever extending radially from said disk for pivoting said disk about its center, said resilient prongs having a pair of connecting pins disposed adjacent said pawls for operatively connecting said prongs to said disk, and said disk having a pair of operating slots into which said connecting pins extend; each of said operating slots having a cam portion extending in a generally circumferential direction but gradually approaching the center of said disk and a radial portion extending to a point on said cam portion remote from said center, whereby upon pivotal movement of said disk in one direction, said prongs are cammed inwardly by its operating slots to disengage said pawls from said ratchet teeth while permitting free movement of said pawls when said connecting pins are in alignment with said radial portions of said operating slots.

References Cited by the Examiner
UNITED STATES PATENTS

| | | | |
|---|---|---|---|
| 2,649,142 | 8/1953 | New | 297—395 |
| 2,654,616 | 10/1953 | Mockli | 280—150 |
| 2,973,029 | 2/1961 | Schlosstein | 297—216 |

LEO FRIAGLIA, *Primary Examiner.*

BENJAMIN HERSH, *Examiner.*

M. S. SALES, *Assistant Examiner.*